United States Patent
Ikeda

(10) Patent No.: US 12,181,871 B2
(45) Date of Patent: Dec. 31, 2024

(54) INFORMATION PRESENTATION METHOD, INFORMATION PRESENTATION DEVICE, AND RECORDING MEDIUM

(71) Applicant: Panasonic Intellectual Property Management Co., Ltd., Osaka (JP)

(72) Inventor: Yoichi Ikeda, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 314 days.

(21) Appl. No.: 17/780,426

(22) PCT Filed: Jan. 22, 2021

(86) PCT No.: PCT/JP2021/002328
§ 371 (c)(1),
(2) Date: May 26, 2022

(87) PCT Pub. No.: WO2021/171855
PCT Pub. Date: Sep. 2, 2021

(65) Prior Publication Data
US 2023/0004155 A1    Jan. 5, 2023

(30) Foreign Application Priority Data
Feb. 27, 2020    (JP) ................. 2020-031740

(51) Int. Cl.
*G05D 1/00*    (2024.01)
*A47L 9/28*    (2006.01)

(52) U.S. Cl.
CPC .......... *G05D 1/0044* (2013.01); *A47L 9/2894* (2013.01); *A47L 2201/04* (2013.01)

(58) Field of Classification Search
CPC . G05D 1/0044; A47L 9/2894; A47L 2201/04; A47L 9/28
See application file for complete search history.

(56) References Cited

U.S. PATENT DOCUMENTS 5,995,884 A * 11/1999 Allen ................... G05D 1/0225
   701/25
RE46,310 E * 2/2017 Hoffberg .............. H04N 21/252
(Continued)

FOREIGN PATENT DOCUMENTS

CN    109605374 A    4/2019
CN    110470293 A    11/2019
(Continued)

OTHER PUBLICATIONS

Chinese Office Action dated Aug. 23, 2023 issued in the corresponding Chinese Patent Application No. 202180006138.0, with English translation of the Search Report.
International Search Report dated Mar. 30, 2021 issued in International Patent Application No. PCT/JP2020/002328, with English translation.

*Primary Examiner* — Donald J Wallace
*Assistant Examiner* — Jalal C Coduroglu
(74) *Attorney, Agent, or Firm* — Rimon P.C.

(57) ABSTRACT

An information presentation method that is executed by a computer includes acquiring travelling path information that includes a cleaning path and a relocation path, the cleaning path showing positions cleaned by a self-propelled vacuum cleaner in each of a plurality of regions included in a specific area, and the relocation path showing a route of the self-propelled vacuum cleaner that has travelled from one region to another region different from the one region out of the regions, the route being included in the specific area; generating presentation information that includes the cleaning path and the relocation path and that changes the mode of display of at least one of the cleaning path or the relocation path when a specific condition is satisfied; and presenting the presentation information to the user as the travelling path of the self-propelled vacuum cleaner in the specific area.

17 Claims, 14 Drawing Sheets

(56) References Cited

U.S. PATENT DOCUMENTS

| | | | |
|---|---|---|---|
| 11,119,496 B1* | 9/2021 | Ebrahimi Afrouzi | ........................ G05D 1/0274 |
| 2015/0000068 A1* | 1/2015 | Tsuboi | ..................... A47L 9/281 901/1 |
| 2017/0019660 A1* | 1/2017 | Deering | ............. G02B 27/0093 |
| 2017/0329347 A1* | 11/2017 | Passot | ................. A47L 11/4061 |
| 2018/0035606 A1* | 2/2018 | Burdoucci | ........... A01D 34/008 |
| 2019/0302796 A1* | 10/2019 | Watanabe | ........... A47L 11/4061 |
| 2020/0050995 A1* | 2/2020 | Ramanand | .......... G06Q 10/1097 |
| 2020/0201352 A1* | 6/2020 | Wang | ................... G05D 1/0274 |
| 2020/0345191 A1* | 11/2020 | Furuta | ................ A47L 11/4061 |

FOREIGN PATENT DOCUMENTS

| | | | |
|---|---|---|---|
| JP | 11-267074 A | | 10/1999 |
| JP | 2000-060782 A | | 2/2000 |
| JP | 2014096877 A | * | 5/2014 |
| JP | 2014-228389 A | | 12/2014 |
| JP | 2018-106695 A | | 7/2018 |
| JP | 2018-192300 A | | 12/2018 |
| JP | 2019-522301 A | | 8/2019 |
| JP | 2019-198346 A | | 11/2019 |
| WO | 2019/097626 A1 | | 5/2019 |

\* cited by examiner

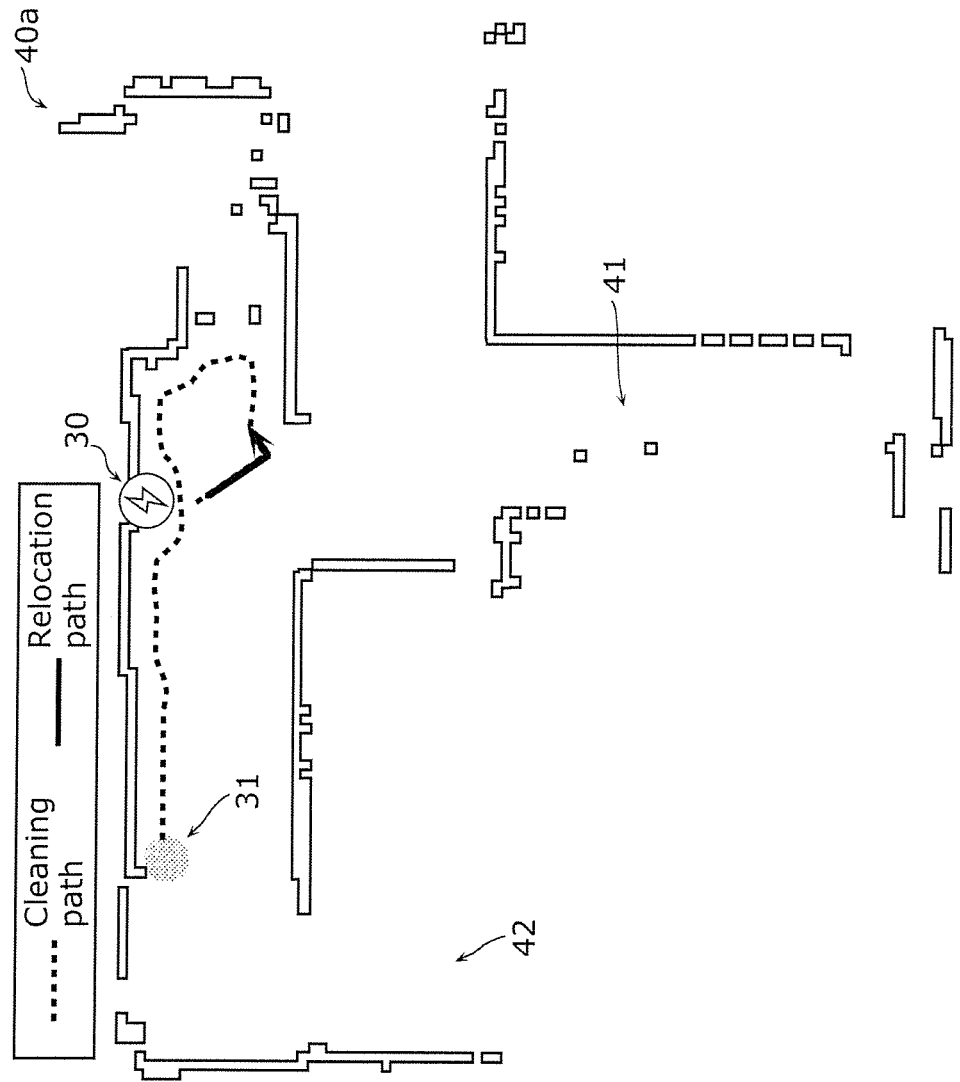

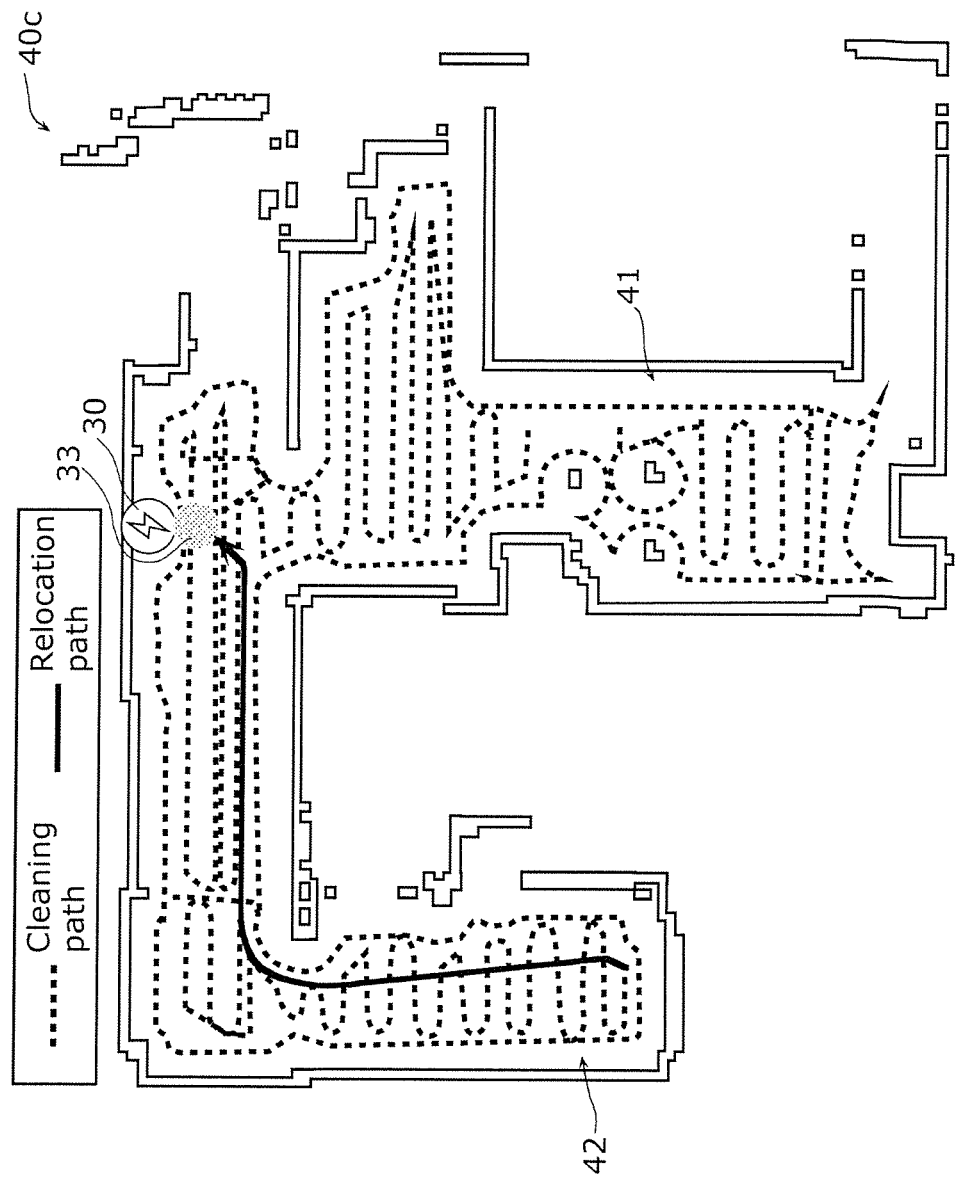

Travelling path

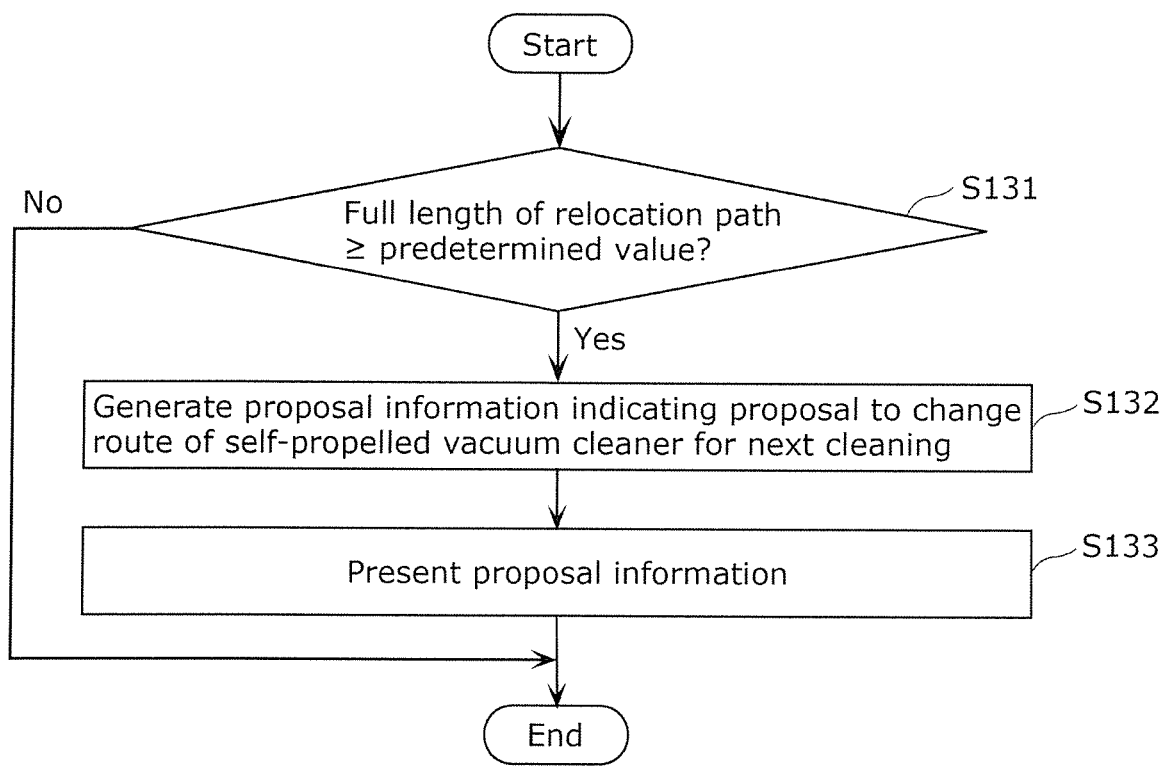

INFORMATION PRESENTATION METHOD, INFORMATION PRESENTATION DEVICE, AND RECORDING MEDIUM

CROSS-REFERENCE OF RELATED APPLICATIONS

This application is the U.S. National Phase under 35 U.S.C. § 371 of International Patent Application No. PCT/JP2021/002328, filed on Jan. 22, 2021, which in turn claims the benefit of Japanese Patent Application No. 2020-031740, filed on Feb. 27, 2020, the entire disclosures of which Applications are incorporated by reference herein.

TECHNICAL FIELD

The present disclosure relates to an information presentation method, an information presentation device, and a recording medium that present information on a self-propelled vacuum cleaner.

BACKGROUND ART

In recent years, self-propelled vacuum cleaners that automatically clean rooms in buildings such as homes have been known (see, for example, PTL 1).

CITATION LIST

Patent Literature

PTL 1
Japanese Unexamined Patent Application Publication No. 2018-192300

SUMMARY OF INVENTION

Technical Problem

Since the self-propelled vacuum cleaners automatically (autonomously) do cleaning, users may in some cases want to know which areas of rooms have been cleaned by the self-propelled vacuum cleaners.

There is however a problem in that when looking at the as-is travelling paths of the self-propelled vacuum cleaners that have run autonomously, the users may be confused about whether the self-propelled vacuum cleaners have provided proper cleaning coverage of areas with complicated travelling paths.

The present disclosure has been made in light of the circumstances described above, and it is an object of the present disclosure to provide an information presentation method, an information presentation device, and a recording medium that enable users to easily grasp how self-propelled vacuum cleaners have done cleaning.

Solution to Problem

To achieve the object described above, an information presentation method according to one embodiment of the present disclosure is an information presentation method that is executed by a computer. The information presentation method includes acquiring travelling path information that includes a cleaning path and a relocation path, the cleaning path showing a position cleaned by a self-propelled vacuum cleaner in each of a plurality of regions included in a specific area, and the relocation path showing a route of the self-propelled vacuum cleaner that has travelled from one region to another region different from the one region out of the plurality of regions, the route being included in the specific area, generating presentation information that includes the cleaning path and the relocation path and that instructs to display at least one of the cleaning path or the relocation path in a different mode of display when a specific condition is satisfied, and presenting the presentation information to a user as a travelling path of the self-propelled vacuum cleaner in the specific area.

To achieve the object described above, an information presentation device according to one embodiment of the present disclosure includes an acquirer that acquires travelling path information that includes a cleaning path and a relocation path, the cleaning path showing a position cleaned by a self-propelled vacuum cleaner in each of a plurality of regions included in a specific area, and the relocation path showing a route of the self-propelled vacuum cleaner that has travelled from one region to another region different from the one region out of the plurality of regions, the route being included in the specific area, a presentation information generator that generates presentation information that includes the cleaning path and the relocation path and that instructs to display at least one of the cleaning path or the relocation path in a different mode of display when a specific condition is satisfied, and a display device that presents the presentation information to a user as a travelling path of the self-propelled vacuum cleaner in the specific area.

It is to be noted that some specific modes of the present disclosure may be implemented via a system, a method, an integrated circuit, a computer program, or a computer-readable recording medium such as a CD-ROM, or may be implemented via any combination of a system, a method, an integrated circuit, a computer program, and a recording medium.

Advantageous Effects of Invention

According to the present disclosure, it is possible to achieve an information presentation method, an information presentation device, and a recording medium that enable a user to easily grasp how the self-propelled vacuum cleaner have done cleaning.

BRIEF DESCRIPTION OF DRAWINGS

FIG. 2A is an explanatory diagram illustrating map information and travelling path information generated during travelling by a self-propelled vacuum cleaner according to the embodiment.

FIG. 2C is an explanatory diagram illustrating the map information and the travelling path information generated during travelling by the self-propelled vacuum cleaner according to the embodiment.

FIG. 11 is a flowchart showing one example of operations of the information presentation device according to the variation of the embodiment.

DESCRIPTION OF EMBODIMENT

The following gives a specific description of an information presentation method and so on according to one embodiment of the present invention with reference to the drawings. The embodiment described below shows one specific example of the present disclosure. Numerical values, shapes, materials, constituent elements, the arrangement and positions of the constituent elements, and other information described in the following embodiment are mere examples, and do not intend to limit the present disclosure. Among the constituent elements of the embodiment described below, those that are not recited in any independent claim, which represents the broadest concept of the present disclosure, are described as optional constituent elements. In the embodiment and the variations, the contents may be combined in any way.

Embodiment

Information Presentation System

Figure 1:
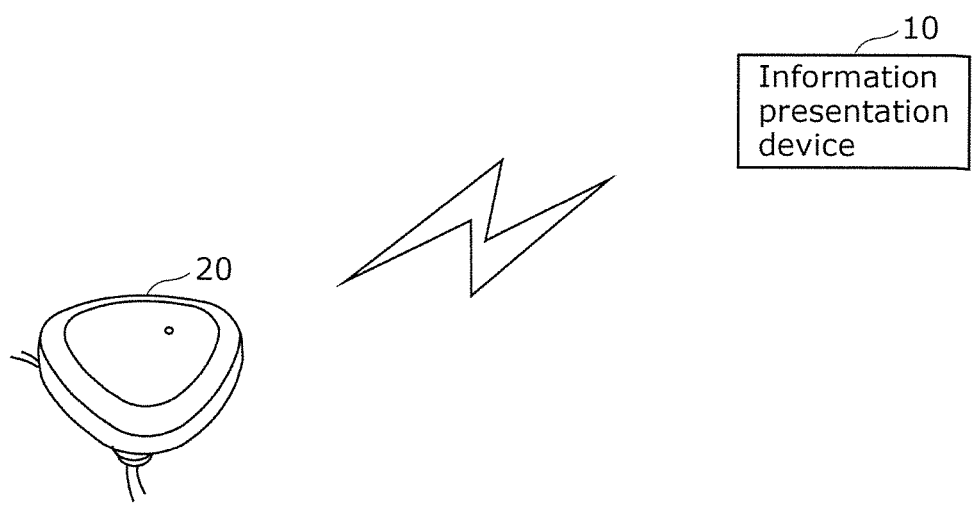
FIG. 1 shows one example of an information presentation system according to an embodiment.

First, an information presentation system according to an embodiment will be described. FIG. 1 shows one example of the information presentation system according to the present embodiment.

The information presentation system according to the present embodiment includes information presentation device 10 and self-propelled vacuum cleaner 20. Information presentation device and self-propelled vacuum cleaner 20 are capable of communication with each other Self-Propelled Vacuum Cleaner 20

Self-propelled vacuum cleaner 20 is a cleaning robot that includes various kinds of sensors (not shown), a travelling controller (not shown), and a cleaning executor (not shown) and that is capable of cleaning floors of rooms in a building such as a home while autonomously travelling on the floors of the rooms. In other words, self-propelled vacuum cleaner 20 is a cleaning robot that is caused to run autonomously in a specific area by the travelling controller and is caused to vacuum dust in that area by the cleaning executor, using the sensors of various kinds.

In the present embodiment, self-propelled vacuum cleaner 20 cleans, for example, each of a plurality of rooms, i.e., each region of a specific area consisting of a plurality of regions, while travelling autonomously. Self-propelled vacuum cleaner 20 also generates a map of the specific area each time during cleaning.

Self-propelled vacuum cleaner 20 further includes map storage 201 and path storage 202 illustrated in FIG. 3, which will be described later. While autonomously travelling in the specific area, self-propelled vacuum cleaner 20 maps each region around travelled locations with sensors such as a camera to generate the map of the specific area and stores map information indicating the generated map in map storage 201. While autonomously travelling in the specific area, self-propelled vacuum cleaner 20 also stores travelling path information in path storage 202 with sensors such as an acceleration sensor and/or a speed sensor, the travelling path information indicating a relocation path that shows travelled positions (coordinate points) of self-propelled vacuum cleaner 20.

The travelling path information as used herein includes a cleaning path and a relocation path. The cleaning path shows positions cleaned by self-propelled vacuum cleaner 20 in each of the regions included in the specific area. The relocation path shows a route of self-propelled vacuum cleaner 20 that has travelled from one region to another region different from the one region, the route being included in the specific area. Note that self-propelled vacuum cleaner 20 travelling on the relocation path may simply travel in each region without doing cleaning, or may travel in each region while doing cleaning. In light of the efficiency of cleaning, self-propelled vacuum cleaner 20 basically runs with no overlaps in cleaning paths.

Note that the sensor of various kinds are not limited to the camera, the acceleration sensor, and the speed sensor described above, and may be any one or more of sensors including an obstacle sensor, a range sensor, an anti-collision sensor, an angular velocity sensor, and a floor sensor. That is, the sensors of various kinds may be sensors of any kind as long as they help self-propelled vacuum cleaner 20 generate a map and acquire a travelling path while travelling autonomously in the specific area, the travelling path showing the travelled positions of self-propelled vacuum cleaner 20. The obstacle sensor is a sensor that detects obstacles existing in front of self-propelled vacuum cleaner 20. The range sensor is a sensor that detects the distance between self-propelled vacuum cleaner 20 and an object such as an obstacle that exists around self-propelled vacuum cleaner 20. The anti-collision sensor is a sensor that detects contact of a bumper mounted around self-propelled vacuum cleaner 20 with an obstacle. The floor sensor is a sensor that detects whether a floor to be cleaned exists, and is mounted at a plurality of positions on the bottom surface of self-propelled vacuum cleaner 20. The acceleration sensor is a sensor that detects acceleration when self-propelled vacuum cleaner 20 runs. The angular velocity sensor is a sensor that detects an angular velocity when self-propelled vacuum cleaner 20 turns around.

Hereinafter, how self-propelled vacuum cleaner 20 that is travelling autonomously draws its relocation path showing travelled positions while generating the map of the specific area will be described with reference to drawings.

Figure 2B:
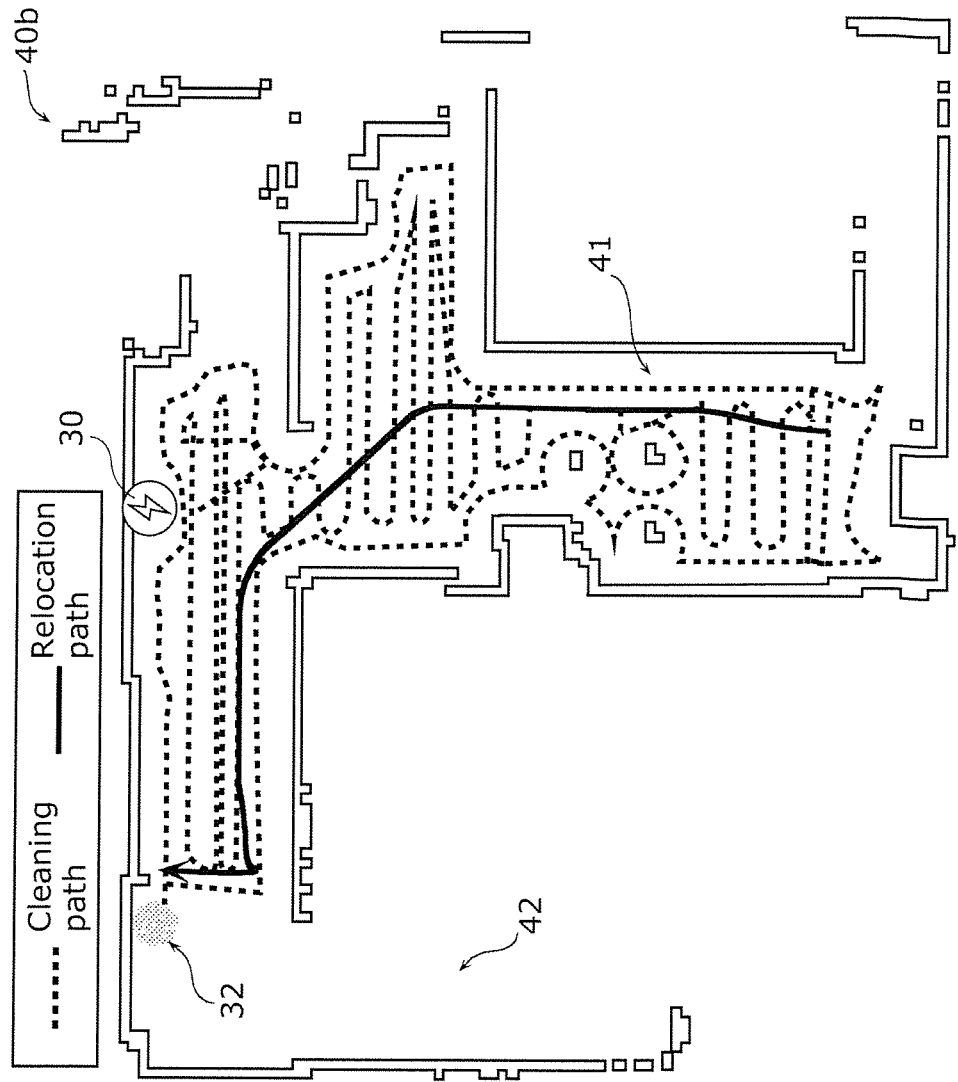
FIG. 2B is an explanatory diagram illustrating the map information and the travelling path information generated during travelling by the self-propelled vacuum cleaner according to the embodiment.

FIGS. 2A to 2C are explanatory diagrams illustrating the map information and the travelling path information generated during travelling by self-propelled vacuum cleaner 20 according to the present embodiment. FIGS. 2A to 2C illustrate a room consisting of two regions 41 and 42 as one example of a range (specific area) to be cleaned by self-propelled vacuum cleaner 20. For the sake of convenience of description, the travelling path of self-propelled vacuum cleaner 20 illustrated in FIGS. 2A to 2C is distinguished into the relocation path and the cleaning path, which are categories of internal processing of self-propelled vacuum cleaner 20. Note that self-propelled vacuum cleaner 20 adds to its travelling path information indicating the categories of internal processing, i.e., whether the relocation path or the cleaning path. Self-propelled vacuum cleaner 20 is, in principle, designed to run with no overlaps in cleaning paths.

First, in order to start cleaning of the room, self-propelled vacuum cleaner 20 positioned at charging base 30 moves from charging base 30 and then starts cleaning as illustrated in FIG. 2A. Self-propelled vacuum cleaner 20 does cleaning while travelling on the cleaning path drawn by the dotted line in FIG. 2A. Map 40a illustrated in FIG. 2A is generated within a range that can be captured by sensors such as the camera during a duration of time from when self-propelled vacuum cleaner 20 departs from charging base 30 until when self-propelled vacuum cleaner 30 arrives at position 31 while travelling on the cleaning path.

Next, self-propelled vacuum cleaner 20 that has arrived at position 31 in FIG. 2A does cleaning and generates map 40b while travelling on the cleaning path in region 41 illustrated in FIG. 2B. Then, when having recognized the boundary of region 41 such as a wall with sensors such as the camera and finished the cleaning of region 41 while travelling on the cleaning path in region 41 illustrated in FIG. 2B, self-propelled vacuum cleaner 20 moves to region 42 different from region 41. Since self-propelled vacuum cleaner 20 knows that the upper left side of region 41 is open when having generated map 40a illustrated in FIG. 2A, self-propelled vacuum cleaner 20 moves toward position 32 that is the end of region 41 and the end of the cleaning path. Note that map 40b illustrated in FIG. 2B is obtained by adding, to map 40a, a map generated within a range that can be captured by the camera when self-propelled vacuum cleaner 20 is travelling on the travelling path, i.e., the cleaning path and the relocation path.

Next, self-propelled vacuum cleaner 20 that have arrived at position 32 in FIG. 2B does cleaning and generates map 40c while travelling on the cleaning path in region 42 illustrated in FIG. 2C. When having recognized the boundary of region 42 such as a wall with sensors such as the camera and finished the cleaning of region 42 while travelling on the cleaning path in region 42 illustrated in FIG. 2C, self-propelled vacuum cleaner 20 tries to move to another region different from region 42. However, since there is no region that is different from region 42 and that has not been cleaned yet in map 40c illustrated in FIG. 2C, self-propelled vacuum cleaner 20 moves toward position 33 in order to return to charging base 30. Note that map 40c illustrated in FIG. 2C is obtained by adding, to map 40b, a map generated within a range that can be captured by the camera when self-propelled vacuum cleaner 20 is travelling on the cleaning path and the relocation path in region 42. The area that is included in map 40C and that includes regions 41 and 42 is a range that is to be cleaned by self-propelled vacuum cleaner 20, and corresponds to the specific area.

In this way, the cleaning path does not follow the same path, but the traveling path may overlap or intersect with the cleaning path. That is, there may be a region with a complicated relocation path. When a user looks at the travelling path that covers such a region with a complicated relocation path, the user is unable to know whether self-propelled vacuum cleaner 20 has provided proper cleaning coverage of that region.

Note that although self-propelled vacuum cleaner 20 stores the travelling path information including its cleaning path and relocation path in path storage 202 and stores the map information indicating its generated map in map storage 201 in the above description, the present disclosure is not limited to this example. Self-propelled vacuum cleaner 20 may be configured to store the travelling path information in a path storage in the cloud and store the map information in a map storage in the cloud.

Information Presentation Device 10

Next, information presentation device 10 will be described with reference to FIG. 3.

Figure 3:
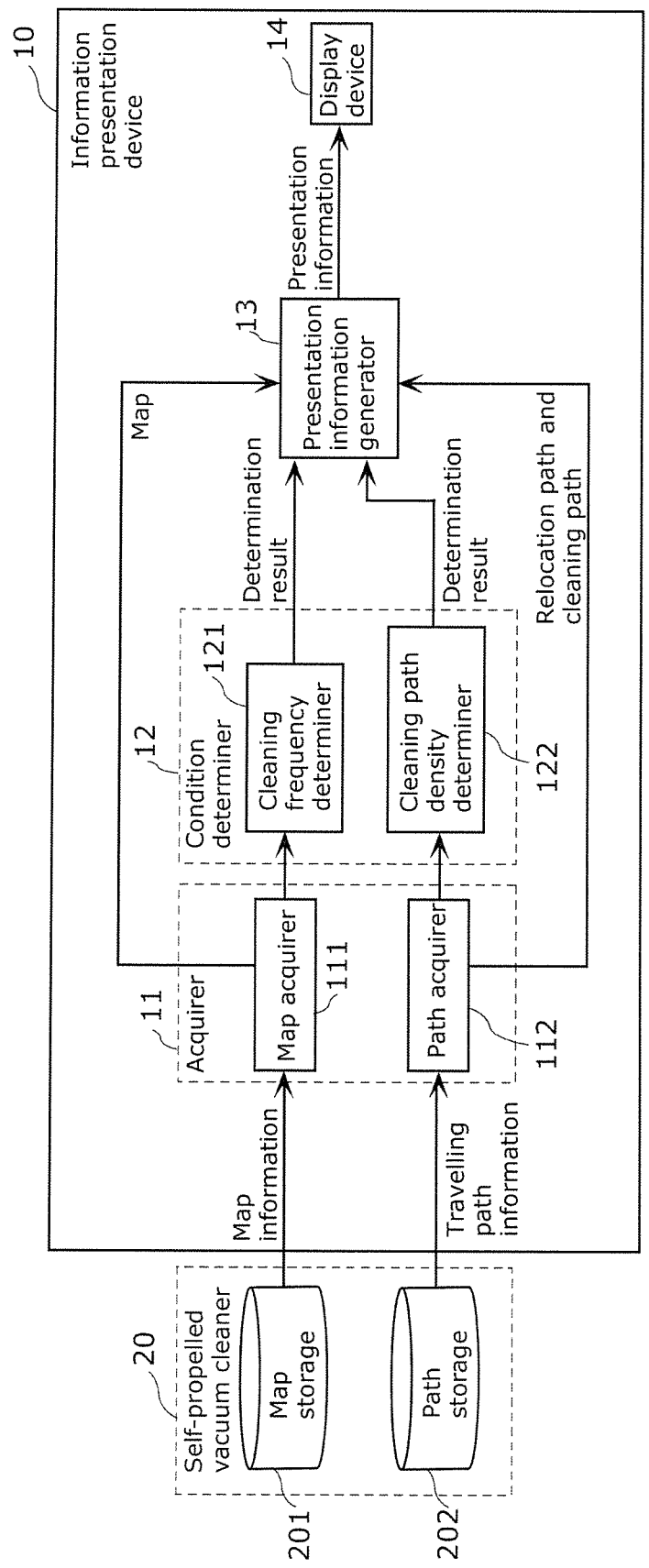
FIG. 3 is a block diagram showing one example of a configuration of an information presentation device according to the embodiment.

FIG. 3 is a block diagram showing one example of a configuration of information presentation device 10 according to the present embodiment.

Information presentation device 10 is capable of displaying at least one of the cleaning path or the relocation path in the travelling path of self-propelled vacuum cleaner 20 in a different mode of display on a display or the like. This enables a user to easily grasp how self-propelled vacuum cleaner 20 have done cleaning.

In the present embodiment, information presentation device 10 includes acquirer 11, condition determiner 12, presentation information generator 13, and display screen 14 as illustrated in FIG. 3. Note that information presentation device 10 does not always have to include display device 14. Hereinafter, each constituent element will be described in detail.

Acquirer 11

Acquirer 11 acquires the travelling path information that includes the cleaning path and the relocation path. The cleaning path shows positions at which self-propelled vacuum cleaner 20 have done cleaning in each of a plurality of regions included in the specific area. The relocation path shows a route of self-propelled vacuum cleaner 20 that have travelled from one region to another region different from the one region, the route being included in the specific area. As described above, the specific area as used herein refers to a range that is to be cleaned in one cleaning operation from when self-propelled vacuum cleaner 20 departs from the charging base to when self-propelled vacuum cleaner 20 returns to the charging base.

In the present embodiment, acquirer 11 includes map acquirer 111 and path acquirer 112.

Map acquirer 111 communicates with self-propelled vacuum cleaner 20, acquires the latest map information generated by self-propelled vacuum cleaner 20 from map storage 201, and stores the acquired map information in a memory (not shown). In the case where the map information is stored in the cloud, map acquirer 111 communicates with the cloud and acquires the latest map information generated by self-propelled vacuum cleaner 20. The memory not shown accumulates past map information acquired by map acquirer 111.

Path acquirer 112 communicates with self-propelled vacuum cleaner 20 and acquires the latest travelling path information that includes the latest cleaning path and relocation path of self-propelled vacuum cleaner 20 from path storage 202. In the case where the travelling path information is stored in the cloud, path acquirer 112 communicates with the cloud and acquires the latest travelling path information on self-propelled vacuum cleaner 20.

Condition Determiner 12

Condition determiner 12 determines whether the travelling path information acquired by acquirer 11 satisfies a specific condition. Condition determiner 12 transmits a result of the determination to presentation information generator 13.

The specific condition as used herein is determined in advance. For example, in either of the cases where there is no past travelling path information that corresponds to the specific area or where there is past travelling path information that corresponds to the specific area, condition determiner 12 may determine that the specific condition is satisfied. It is assumed, for example, that the specific area is divided into a plurality of blocks of a predetermined size. In this case, when the travelling path that includes the cleaning path and the relocation path and that occupies at least one of the blocks has a given density or more, condition determiner 12 may determine that the specific condition is satisfied.

Note that condition determiner 12 may use not only the density of the travelling path but also the density of the cleaning path to make the determination. As another alternative, condition determiner 12 may use cleaning frequency or map cleaning frequency to make the determination.

In the example illustrated in FIG. 3, condition determiner 12 includes cleaning frequency determiner 121 and cleaning path density determiner 122 and uses the density of the cleaning path and/or the map cleaning frequency to determine whether the specific condition determined in advance is satisfied.

Cleaning Frequency Determiner 121

Cleaning frequency determiner 121 determines whether the specific area is cleaned with high frequency by determining whether the specific condition is satisfied on the basis of the past map information and the latest map information acquired by map acquirer 111.

More specifically, first, when the map indicated by the latest map information acquired by map acquirer 111 and the map indicated by the past map information have an area of overlap greater than or equal to a given value, cleaning frequency determiner 121 determines that these maps show the same place (specific area). Since self-propelled vacuum cleaner 20 regenerates the map every time, whether the map indicated by the latest map information and the map indicated by the past map information shows the same place is determined first. Then, on the basis of the number of maps indicated by the past map information that shows the same place as the map indicated by the latest map information, cleaning frequency determiner 121 counts the number of times this place has been cleaned (this number is designated as "n").

The above-described determination may be made as follows. Specifically, cleaning frequency determiner 121 may first overlay the map indicated by the latest map information and each map indicated by the past map information such that the orientation and coordinates of the charging base on the latest map match those on the past map. Then, cleaning frequency determiner 121 may count the number of maps (n maps) that have an area of overlap greater than or equal to a predetermined value (e.g., 80%).

Next, cleaning frequency determiner 121 sets a number obtained by dividing the counted number of times (n) by a total number of cleaning times (N) as the map cleaning frequency, and determines whether the total number of cleaning times (N) is greater than or equal to a predetermined value (e.g., 10) and the map cleaning frequency is greater than or equal to a predetermined value (e.g., 0.5).

Then, when the total number of cleaning times (N) is greater than or equal to the predetermined value and the map cleaning frequency is greater than or equal to the predetermined value, cleaning frequency determiner 121 transmits, to presentation information generator 13, a result of the determination indicating that the specific condition is satisfied. On the other hand, when the total number of cleaning times (N) is less than the predetermined value (e.g., 10) or when the map cleaning frequency is less than the predetermined value (e.g., 0.5), cleaning frequency determiner 121 transmits, to presentation information generator 13, a result of the determination indicating that the specific condition is not satisfied.

In this way, cleaning frequency determiner 121 determines whether the specific area has ever been cleaned in the past, and if the specific area has been cleaned in the past, further determines the number of times cleaning has been done, and computes the map cleaning frequency. Then, cleaning frequency determiner 121 uses the map cleaning frequency to determine whether the specific condition is satisfied, and transmits the result of the determination to presentation information generator 13.

Cleaning Path Density Determiner 122

Cleaning path density determiner 122 determines whether there is any region with complicated and poorly visible travelling path by determining whether the specific condition is satisfied on the basis of the latest travelling path information acquired by path acquirer 112.

More specifically, first, cleaning path density determiner 122 divides the travelling path into one meter square blocks and determines, on the basis of the latest travelling path information acquired by path acquirer 112, whether the number of coordinates along the cleaning path in each block is greater than or equal to a predetermined value (e.g., 10 coordinates).

Then, when there is any block in which the number of coordinates along the cleaning path is greater than or equal to the predetermined value, cleaning path density determiner 122 transmits, to presentation information generator 13, a result of the determination indicating that the specific condition is satisfied.

In this way, cleaning path density determiner 122 determines, for each of a plurality of predetermined blocks included in the specific area, whether the block includes a complicated and poorly visible cleaning path and transmits the result of the determination to presentation information generator 13.

Presentation Information Generator 13

Presentation information generator 13 generates presentation information that includes the cleaning path and relocation path of self-propelled vacuum cleaner 20 and that changes the mode of display of at least one of the cleaning path or the relocation path when the specific condition is satisfied.

For example, when there is no past travelling path information that corresponds to the specific area as the specific condition, presentation information generator 13 may use this condition as a specific condition and generate presentation information that instructs to display the relocation path in a different mode of display. As another alternative, for example, when there is past travelling path information that corresponds to the specific area, presentation information generator 13 may use this condition as a specific condition and generate presentation information that instructs to display the cleaning path in a different mode of display.

It is assumed that the specific area is divided into a plurality of blocks of a predetermined size. In this case, for example, presentation information generator 13 may generate presentation information that instructs to display the relocation path in a different mode of display when the travelling path that includes the cleaning path and the relocation path and that occupies at least one of the blocks has a given density or more, this case being used as a specific condition. Here, presentation information generator 13 may further generate presentation information that instructs to display the relocation path in a different mode of display for each of the blocks in accordance with the density of the travelling path that occupies the block.

In the present embodiment, presentation information generator 13 generates the presentation information in accordance with the determination result obtained from condition determiner 12. For example, presentation information generator 13 may generate presentation information that instructs to display the cleaning path or the relocation path in a different mode of display when condition determiner 12 has transmitted a determination result indicating that the specific condition is satisfied.

Presentation information generator 13 may also generate presentation information that instructs to display the relocation path in a different mode of display by, for example, reducing the concentration of the relocation path, when condition determiner 12 has transmitted a determination result indicating that the specific condition is satisfied on the basis of the density of the cleaning path and/or the map cleaning frequency.

For example, it is assumed that condition determiner 12 has transmitted a first determination result to presentation information generator 13, the first determination result indicating that the specific condition is satisfied and being output when the total number of cleaning times (N) is greater than or equal to the predetermined value and the map cleaning frequency is greater than or equal to the predetermined value. In this case, presentation information generator 13 may generate, on the basis of the first determination result, presentation information that instructs to display the relocation path in a different mode of display by, for example, reducing the concentration of the relocation path by 50%.

It is also assumed, for example, that condition determiner 12 has transmitted a second determination result to presentation information generator 13, the second determination result indicating that the specific condition is satisfied and being output when there is any block in which the number of coordinates along the cleaning path is greater than or equal to the predetermined value. In this case, presentation information generator 13 may generate, on the basis of the second determination result, presentation information that instructs to display the relocation path in a different mode of display by, for example, reducing the concentration of the relocation path by 50% in the block in which the number of coordinates along the cleaning path is greater than or equal to the predetermined value.

It is also assumed that condition determiner 12 has transmitted the first and second determination results described above to presentation information generator 13. In this case, presentation information generator 13 may generate, on the basis of the first and second determination results, presentation information that instructs to display the relocation path in a different mode of display by, for example, reducing the concentration of the relocation path by 50% and further reducing the concentration of the relocation path by 50% in the block in which the number of coordinates along the cleaning path is greater than or equal to the predetermined value.

Note that the examples of changing the mode of display are not limited to the case of changing the concentration of the relocation path. Other example will be described later.

Display Device 14

Display device 14 may include, for example, a display, but is not limited thereto. Display device 14 may be a mobile terminal such as a smartphone or a tablet, or may be a TV, a projector, or a personal computer. That is, the form of display device 14 is not limited as long as display device 14 includes a display and enables the user to visually recognize the presentation information.

Display device 14 presents the presentation information generated by presentation information generator 13 to a user as the travelling path of self-propelled vacuum cleaner 20 in the specific area. That is, display device 14 presents the presentation information to a user by displaying the presentation information that instructs to display at least one of the cleaning path or the relocation path in a different mode of display on the display. The mode of display as used herein refers to at least one of the light and shade, color, brightness, line thickness, or line type of each path displayed on the display.

In the present embodiment, display device 14 overlays and displays the presentation information transmitted from presentation information generator 13 on the map indicated by the latest map information acquired by acquirer 11 on the display. For example, display device 14 overlays the latest cleaning path on the map indicated by the latest map information acquired by acquirer 11, and overlays and displays the relocation path in a different mode of display (e.g., light and shade) on the display on the basis of the presentation information transmitted from presentation information generator 13.

As one example, a case is described in which display device 14 displays the line thickness of the relocation path in a different mode of display on the display.

Figure 4A:
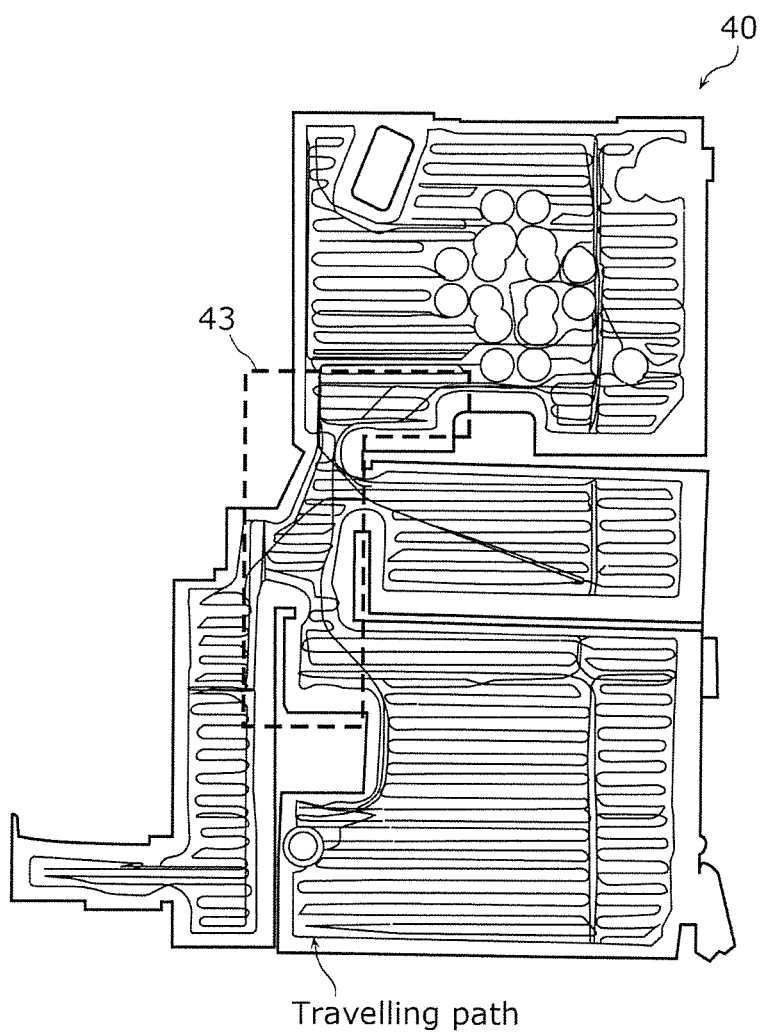
FIG. 4A shows one example of the case in which a relocation path and a cleaning path according to a comparative example are displayed in the same mode of display.
Figure 4B:
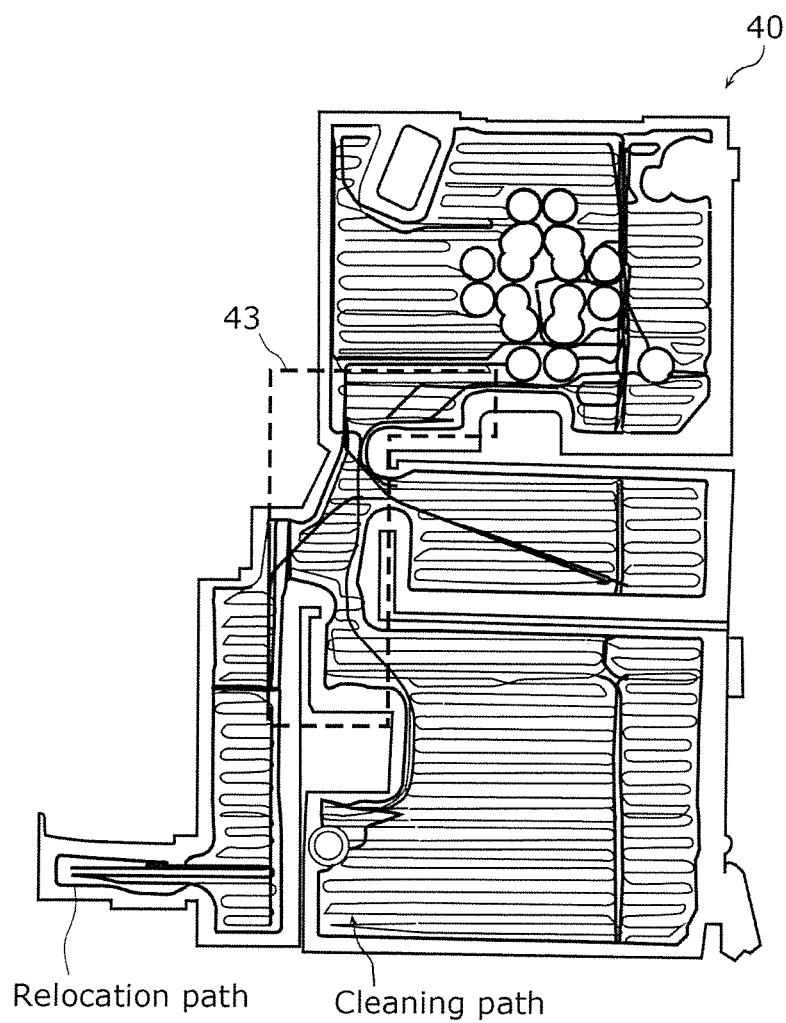
FIG. 4B shows one example of the case in which the line thickness of a relocation path according to the embodiment is displayed in a different mode of display.

FIG. 4A shows an example of the case in which the relocation path and the cleaning path according to a comparative example are displayed in the same mode of display. FIG. 4B shows an example of the case in which the line thickness of the relocation path according to the present embodiment is displayed in a different mode of display. In FIG. 4A, display device 14 overlays the relocation path and the cleaning path that are displayed in the same mode of display on map 40. That is, in FIG. 4A, the relocation path and the cleaning path are overlaid on map 40 as undistinguishable travelling paths. On the other hand, in FIG. 4B, display device 14 overlays the cleaning path and the relocation path that is drawn with a thicker line than the line of the cleaning path on map 40. That is, in FIG. 4B, the relocation path and the cleaning path are overlaid on map 40 as distinguishable travelling paths.

As can be seen from a comparison between FIG. 4A and FIG. 4B, in FIG. 4A, the cleaning path and the relocation path overlaid on map 40 are drawn with the same line thickness and are complicated particularly in region 43. Thus, it is not easy for a user who looks at map 40 illustrated in FIG. 4A to know whether self-propelled vacuum cleaner 20 has provided proper cleaning coverage of region 43. On the other hand, in FIG. 4B, the cleaning path and the relocation path overlaid on map 40 are drawn with different line thicknesses, and the cleaning path can be distinguished easily even in region 43 that includes the complicated cleaning path and relocation path. This enables the user to easily identify the cleaning path by, for example, simply looking at region 43 that includes the complicated cleaning path and relocation path on map 40 illustrated in FIG. 4B and accordingly to know whether self-propelled vacuum cleaner 20 has provided proper cleaning coverage of region 43.

Hardware Configuration of Information Presentation Device 10

Figure 5:
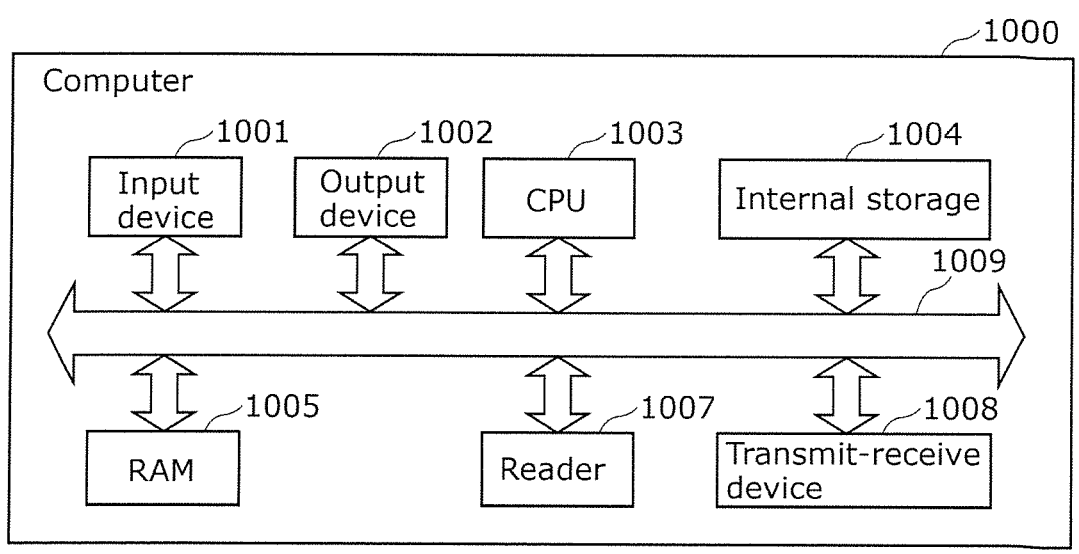
FIG. 5 shows one example of a computer hardware configuration that implements functions of the information presentation device according to the embodiment via software.

Next, a hardware configuration of information presentation device 10 according to the present embodiment will be described with reference to FIG. 5. FIG. 5 shows one example of a hardware configuration of computer 1000 that implements the functions of information presentation device 10 according to the present embodiment via software.

As illustrated in FIG. 5, computer 1000 includes input device 1001, output device 1002, CPU 1003, internal storage 1004, RAM 1005, reader 1007, transmit-receive device 1008, and bus 1009. Input device 1001, output device 1002, CPU 1003, internal storage 1004, RAM 1005, reader 1007, and transmit-receive device 1008 are connected via bus 1009.

Input device 1001 is a device that serves as a user interface such as an input button, a touch pad, and a touch panel display and accepts operation from a user. Note that input device 1001 may be configured to accept not only contact operation from a user but also voice operation or remote operation from a user via a remote controller or any other device.

Internal storage 1004 may, for example, be a flash memory. Internal storage 1004 may store in advance at least one of a program for implementing the functions of information presentation device 10 or an application that uses the functional configuration of information presentation device 10.

RAM 1005 is a random access memory (RAM) and used to store data or other information during execution of the program or the application.

Reader 1007 reads information from a recording medium such as a universal serial bus (USB) memory. Reader 1007 reads a program or an application as described above from the recording medium that records the program or the application, and stores the program or the application in internal storage 1004.

Transmit-receive device 1008 is a communication circuit capable of wireless or wired communication. For example, transmit-receive device 1008 communicates with a server device connected to a network, downloads a program or an application as described above from the server device, and stores the downloaded program or application in internal storage 1004.

CPU 1003 is a central processing unit that copies a program or an application stored in internal storage 1004 to RAM 1005 and sequentially reads and executes a command included in the program or the application from RAM 1005.

In this way, information presentation device 10 is a device whose functional configuration illustrated in FIG. 3 is implemented via a computer as illustrated FIG. 5. Note that information presentation device 10 may be a server device, a mobile terminal such as a smartphone or a tablet, or a personal computer.

Operations

Operations of information presentation device 10 configured as described above according to the present embodiment will be described with reference to the drawings.

Figure 6:
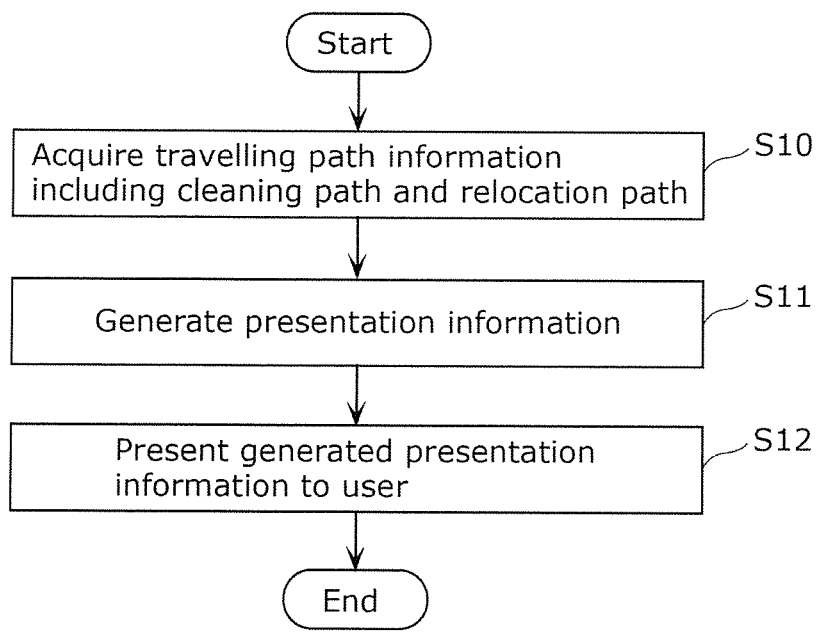
FIG. 6 is a flowchart showing one example of operations of the information presentation device according to the embodiment.

FIG. 6 is a flowchart showing one example of the operations of information presentation device 10 according to the present embodiment.

First, as illustrated in FIG. 6, information presentation device 10 acquires the travelling path information including the cleaning path and relocation path of self-propelled vacuum cleaner 20 (S10). More specifically, information presentation device 10 acquires the travelling path information stored in self-propelled vacuum cleaner 20 or in the cloud. In the present embodiment, information presentation device 10 further acquires the map information stored in self-propelled vacuum cleaner 20 or in the cloud.

Next, information presentation device 10 generates the presentation information including the cleaning path and the relocation path acquired in step S10 (S11). More specifically, information presentation device 10 generates the presentation information that includes the cleaning path and the relocation path acquired in step S10 and that changes the mode of display of at least one of the cleaning path or the relocation path when a specific condition is satisfied. For example, when the specific condition is satisfied, information presentation device 10 generates the presentation information that instructs to display at least one of the cleaning path or the relocation path in a different mode of display, such as line type, brightness, color, and light and shade.

Next, information presentation device 10 presents the presentation information generated in step S11 to a user as the travelling path of self-propelled vacuum cleaner 20 in the specific area (S12).

Figure 7:
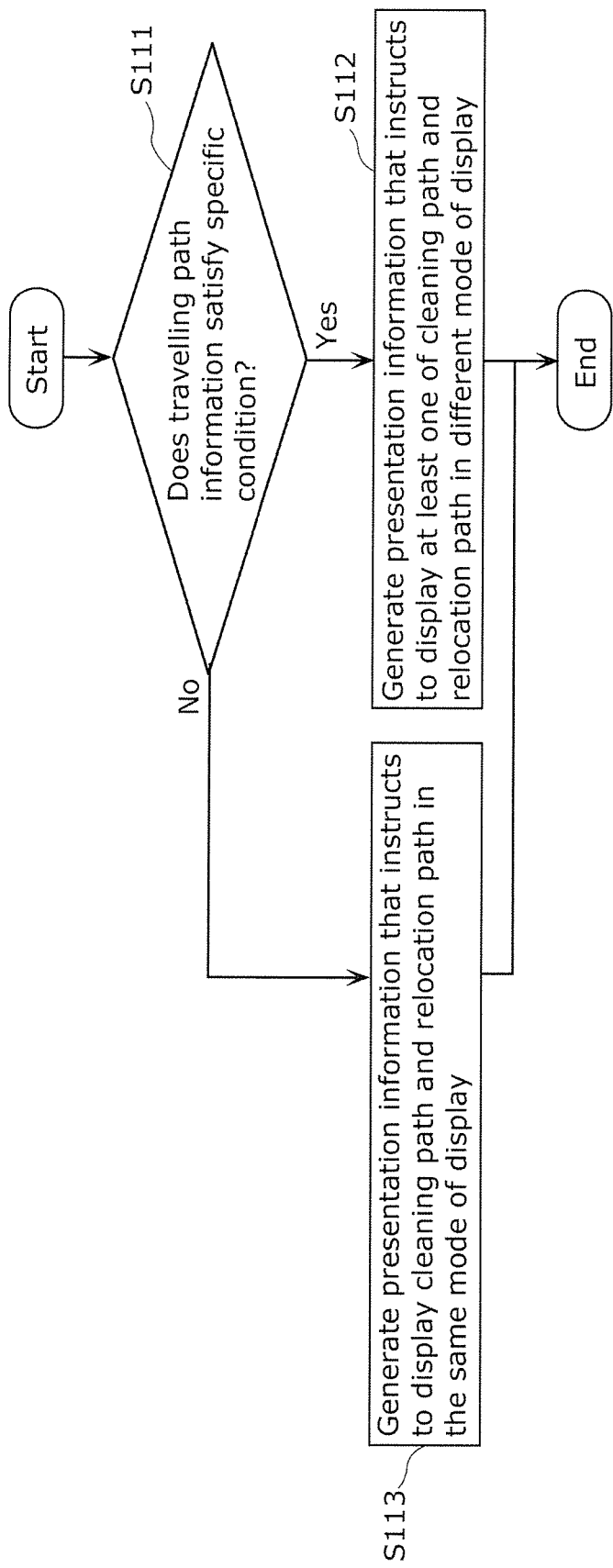
FIG. 7 is a flowchart showing one example of a detailed operation performed in step S11 illustrated in FIG. 6.

FIG. 7 is a flowchart showing one example of detailed operations performed in step S11 illustrated in FIG. 6.

In step S11, first, information presentation device 10 determines whether the travelling path information acquired in step S10 satisfies the specific condition (S111).

When having determined in step S111 that the travelling path information satisfies the specific condition (Yes in S111), information presentation device 10 generates the presentation information that instructs to display at least one of the cleaning path or the relocation path in a different mode of display (S112).

On the other hand, when having determined in step S111 that the travelling path information does not satisfy the specific condition (No in S111), information presentation device 10 generates the presentation information that instructs to display the cleaning path and the relocation path in the same mode of display (S113).

Advantageous Effects

As described above, the information presentation method and information presentation device 10 according to the present embodiment make it possible to display at least one of the cleaning path and relocation path of the travelling path of self-propelled vacuum cleaner 20 in a different mode of display (makes at least one of the cleaning path or the traveling path visible). This enables the user to easily grasp how self-propelled vacuum cleaner 20 has done cleaning. Thus, when self-propelled vacuum cleaner 20 has done cleaning in the specific area, the user is able to grasp how self-propelled vacuum cleaner 20 have travelled and whether self-propelled vacuum cleaner 20 have provided proper cleaning coverage of the specific area from the travelling paths that are displayed in different modes of display. As a result, it is possible to achieve the effect of improving the sense of security and the level of satisfaction with the cleaning done by self-propelled vacuum cleaner 20.

Note that although information presentation device 10 according to the present embodiment includes presentation information generator 13 in the above description, the present disclosure is not limited thereto. Information presentation device 10 does not necessarily have to include presentation information generator 13. In this case, presentation information generator 13 may be included in a mobile terminal such as a smartphone or a tablet, and this mobile terminal may be configured to be capable of communication with information presentation device 10 and to be also capable of communication with other devices such as another portable terminal including display device 14 or information presentation device 10.

Information presentation device 10 according to the present embodiment is not limited to the case of serving as the server device as described above, and part of the processing performed by information presentation device 10 according to the present embodiment may be implemented in the cloud or via another server device. Since server devices may configure a cloud environment, a configuration is also possible in which part of the function is implemented in the cloud.

Although, in the above description, information presentation device 10 according to the present embodiment makes the relocation path visible by changing the mode of display of at least one of the cleaning path or relocation path of the travelling path of self-propelled vacuum cleaner 20 and thereby enables the user to check the result of cleaning, the present disclosure is not limited thereto. For example, information presentation device 10 according to the present embodiment may not only make the relocation path visible to enable the user to check the result of cleaning, but also propose the user to change the way of cleaning that self-propelled vacuum cleaner 20 will do next time. Hereinafter, this case will be described as a variation, focusing on differences from the above-described embodiment.

Variations

Information Presentation Device 10A

Figure 8:
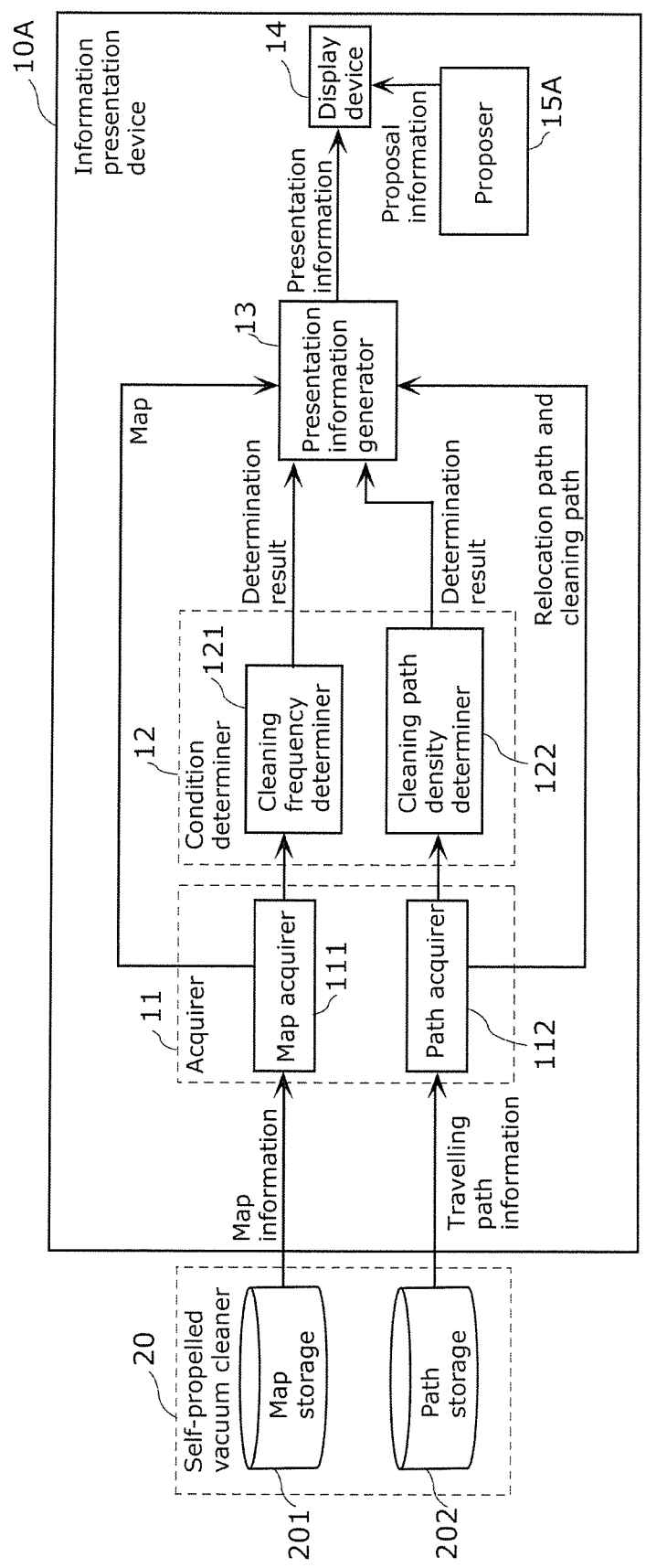
FIG. 8 is a block diagram showing one example of a configuration of an information presentation device according to a variation of the embodiment.

FIG. 8 is a block diagram showing one example of a configuration of information presentation device 10A according to a variation of the present embodiment. Elements that are similar to those in FIG. 3 are given the same reference signs, and a detailed description thereof shall be omitted.

Information presentation device 10A is capable of making the relocation path visible and enabling a user to check the result of cleaning by using a different mode of display to display at least one of the cleaning path or relocation path of the travelling path of self-propelled vacuum cleaner 20 on a display or the like. According to this variation, information presentation device 10A not only makes the relocation path visible and enables the user to check the result of cleaning, but also proposes the user to change the way of cleaning that self-propelled vacuum cleaner 20 will do next time.

Information presentation device 10A illustrated in FIG. 8 differs from information presentation device 10 according to the above-described embodiment in that a configuration of proposer 15A is added.

Proposer 15A

Proposer 15A generates proposal information and presents the generated proposal information to a user.

Figure 9:
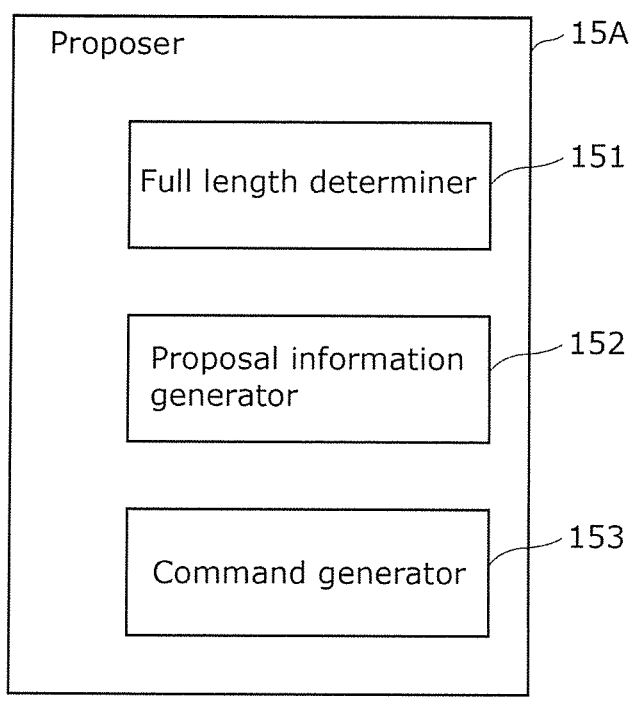
FIG. 9 is a block diagram illustrating a functional configuration of a proposer according to the variation of the embodiment.

FIG. 9 is a block diagram illustrating a functional configuration of proposer 15A according to the variation of the present embodiment.

As illustrated in FIG. 9, proposer 15A includes full length determiner 151, proposal information generator 152, and command generator 153.

Full length determiner 151 determines whether the full length of the relocation path included in the travelling path information acquired by acquirer 11 is greater than or equal to a predetermined value. According to this variation, full length determiner 151 uses the map indicated by the latest map information generated by self-propelled vacuum cleaner 20 and acquired by acquirer 11 to determine whether the full length of the relocation path is greater than or equal to the predetermined value. For example, full length determiner 151 may divide the full length of the relocation path along the length and breadth that define the area of the map indicated by the map information, and calculate a sum of a length and a breadth that are obtained by dividing the full length of the relocation path as the full length of the relocation path. Then, when the ratio of a sum of the length and breadth that define the area of the map to a sum of the length and the breadth that are obtained by dividing the full length of the relocation path is greater than or equal to a threshold value, full length determiner 151 may determine that the full length of the relocation path is greater than or equal to the predetermined value.

When full length determiner 151 has determined that the full length of the relocation path is greater than or equal to the predetermined value, proposal information generator 152 generates proposal information that indicates a proposal to change the route of self-propelled vacuum cleaner 20 for the next cleaning and presents the generated proposal information to the user.

According to this variation, proposal information generator 152 generates the proposal information that indicates a proposal to change the way of cleaning by, for example, changing the route of self-propelled vacuum cleaner 20 for the next cleaning. Proposal information generator 152 presents the proposal information to the user by outputting the generated proposal information to display device 14 and causing display device 14 to display the proposal information.

Figure 10:
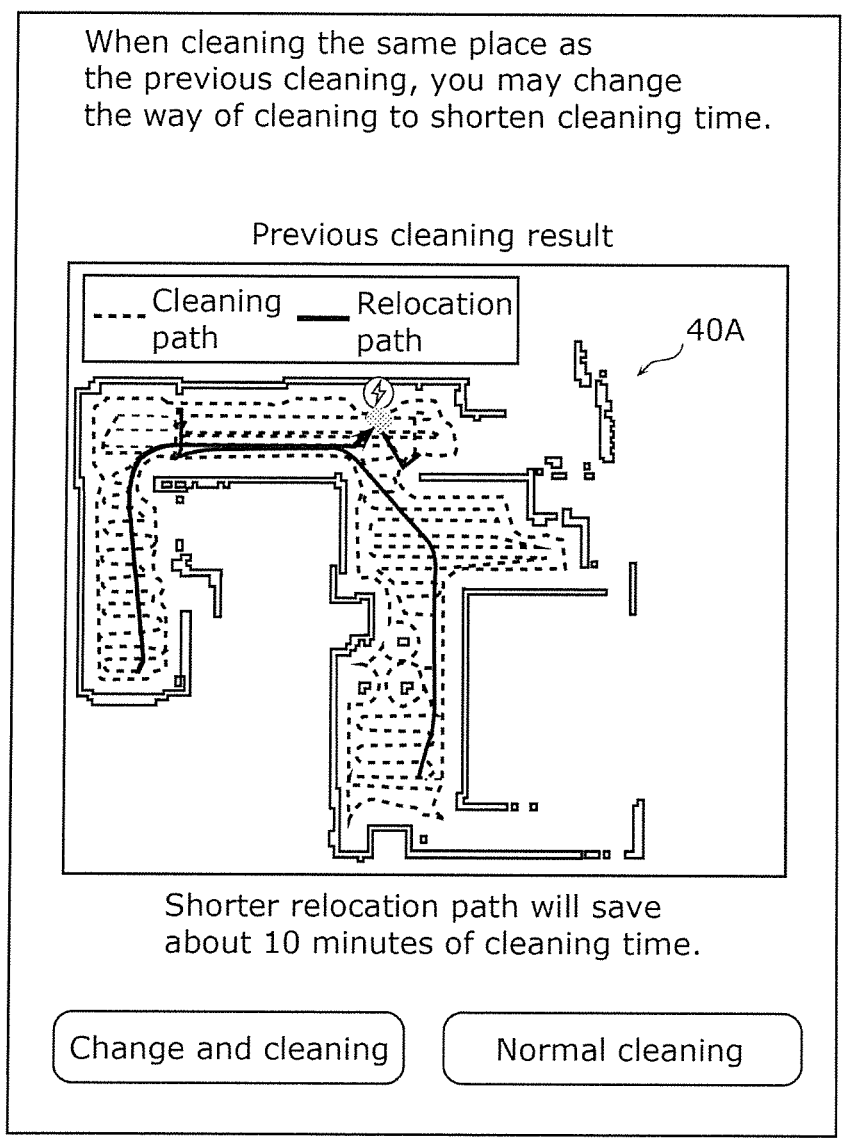
FIG. 10 shows one example of proposal information according to the variation of the embodiment.

FIG. 10 shows one example of the proposal information according to the variation of the present embodiment. FIG. 10 shows one example of the proposal information that presents the relocation path as a result of cleaning together with map 40A and proposes to change the way of cleaning that self-propelled vacuum cleaner 20 will do next time. In the example illustrated in FIG. 10, as the next way of cleaning, it is proposed to alter the sequence of regions to be cleaned in the specific area indicated by map 40A. In the example illustrated in FIG. 10, the proposal also indicates that the cleaning time will be shortened by about 10 minutes as a result of shortening the relocation path in response to the proposal.

Note that the purpose of presenting the relocation path with map 40A is to enable the user to determine how the nest cleaning should be done, as a result of displaying map 40A and the relocation path to the user.

When the user has approved the proposal information generated by proposal information generator 152, command generator 153 generates a command to change the route of self-propelled vacuum cleaner 20 for the next cleaning on the basis of this proposal information. Command generator 153 transmits the generated command to self-propelled vacuum cleaner 20.

As one example of the case in which the user approves the proposal information, a case is conceivable in which the user selects a choice "Change and Clean" as illustrated in FIG. 10. The user is able to approve the proposal information by inputting the selection via an interface (not shown). When the user has selected the choice "Change and Clean" illustrated in FIG. 10, command generator 153 generates a command to alter the sequence of regions to be cleaned in the specific area and transmits the command to self-propelled vacuum cleaner 20.

Operations

Next, operations of information presentation device 10A configured as described above according to the variation will be described with reference to drawings.

FIG. 11 is a flowchart showing one example of the operations of information presentation device 10A according to the variation of the present embodiment.

As illustrated in FIG. 11, first, information presentation device 10A determines whether the full length of the relocation path is greater than or equal to a predetermined value (S131). More specifically, information presentation device 10A determines whether the full length of the relocation path included in the travelling path information acquired by acquirer 11 is greater than or equal to the predetermined value, using the map indicated by the latest map information generated by self-propelled vacuum cleaner 20 and acquired by acquirer 11. To describe this with reference to the example illustrated in FIG. 10, information presentation device 10A determines whether the full length of the relocation path is greater than or equal to the predetermined value by determining whether the ratio of a sum of a length and a breadth that are obtained by dividing the full length of the relocation path lengthwise and crosswise of map 40A to the sum of the length and breadth of map 40A is greater than or equal to a threshold value.

When the full length of the relocation path is greater than or equal to the predetermined value in step S131 (Yes in S131), information presentation device 10A generates proposal information that indicates a proposal to change the route of self-propelled vacuum cleaner 20 for the next cleaning (S132). To describe this with reference to the example illustrated in FIG. 10, information presentation device 10A generates proposal information that indicates a proposal to change the way of cleaning by, for example, altering the sequence of regions to be cleaned in the specific area indicated in map 40A and thereby to change the route of self-propelled vacuum cleaner 20 for the next cleaning.

Then, information presentation device 10 presents the proposal information generated in step S132 to the user (S133). More specifically, information presentation device 10 presents the proposal information to the user by outputting the generated proposal information to display device 14 and causing display device 14 to display the proposal information.

Advantageous Effects

As described above, the information presentation method and information presentation device 10A according to this variation make it possible to display at least one of the cleaning path or relocation path of the travelling path of self-propelled vacuum cleaner 20 in a different mode of display (makes at least one of the cleaning path or the relocation path visible). This enables the user to easily grasp how self-propelled vacuum cleaner 20 has done cleaning.

Moreover, the information presentation method and information presentation device 10A according to this variation make it possible to propose the user to change the way of cleaning that self-propelled vacuum cleaner 20 will do next time. Accordingly, it is possible to change the route of self-propelled vacuum cleaner 20 for the next cleaning and to shorten the distance of travel. This shortens the time required for the next cleaning by self-propelled vacuum cleaner 20 and reduces power consumption required for the next cleaning by self-propelled vacuum cleaner 20. Besides, the shortening of the time required for the next cleaning by self-propelled vacuum cleaner 20 results in shortening of the duration of noise generated by self-propelled vacuum cleaner 20 during cleaning, and therefore also brings about the effect of increasing the comfort of the user in the specific area when the user stays in the specific area during cleaning by self-propelled vacuum cleaner 20.

Note that if objects laid out in the specific area are rearranged, the range of cleaning will change, and accordingly the route of subsequent travel of self-propelled vacuum cleaner 20 for cleaning the specific area tends to increase. However, the distance of travel can be shortened by self-propelled vacuum cleaner 20 proposing to the user to change the way of cleaning for the next cleaning and thereby changing the route of self-propelled vacuum cleaner 20 for the next cleaning. This shortens the time required for the next cleaning by self-propelled vacuum cleaner 20.

Other Embodiments

While the information presentation method according to the embodiment has been described thus far, the present disclosure is not intended to be limited to the above-described embodiment.

The present disclosure may be implemented not only via the information presentation method but also via a program for causing a computer (computer system) to execute the information presentation method. The present disclosure may also be implemented via a non-transitory computer-readable recording medium such as a CD-ROM that records the aforementioned program.

For example, when the information presentation method and the information presentation device according to the present disclosure are implemented via a program (software), each step is executed by executing the program using hardware resources such as the CPU, memory, and input/output circuit of a computer. That is, each step is executed by the CPU acquiring and computing data from the memory, the input/output circuit, or any other device and outputting computational results to the memory, the input/output circuit, or any other device.

Each constituent element included in information presentation device 10 according to the above-described embodiment may be implemented via a dedicated or general-purpose circuit.

Each constituent element included in information presentation device 10 according to the above-described embodiment may also be implemented via large scale integration (LSI) serving as an integrated circuit (IC).

The integrated circuit is not limited to LSI, and may be implemented via a dedicated circuit or a general-purpose processor. A field programmable gate array (FPGA) that enables programming or a reconfigurable processor capable of reconfiguring connections and settings of circuit cells inside the LSI may be used.

Moreover, if other circuit integration techniques that replace LSIs make their debuts with the advance of semiconductor technology or with derivation from another technology, such techniques may be used to integrate each constituent element included in information presentation device 10 into a circuit.

The present disclosure also includes other embodiments obtained by applying various modifications conceivable by those skilled in the art to the embodiment, and embodiments achieved by any combination of constituent elements and functions of the embodiment without departing from the scope of the present disclosure.

The invention claimed is:

1. An information presentation method that is executed by a computer, the information presentation method comprising:
   - acquiring travelling path information that includes a cleaning path and a relocation path, the cleaning path showing a position cleaned by a self-propelled vacuum cleaner in each of a plurality of regions included in a specific area, and the relocation path showing a route of the self-propelled vacuum cleaner that has travelled from one region to another region different from the one region out of the plurality of regions, the route being included in the specific area;
   - determining whether a specific condition is satisfied, and when the specific condition is satisfied, generating presentation information that includes the cleaning path and the relocation path and that instructs to display at least one of the cleaning path or the relocation path in a different mode of display; and
   - presenting the presentation information to a user as a travelling path of the self-propelled vacuum cleaner in the specific area,
   - wherein the specific condition includes at least one of (i) the specific area has been cleaned in the past with cleaning frequency greater than or equal to a predetermined value and (ii) when the specific area is divided into a plurality of blocks of a predetermined size, a travelling path including the cleaning path and the relocation path and occupying at least one of the plurality of blocks has a density greater than or equal to a given value.

2. The information presentation method according to claim 1, wherein the generating of the presentation information includes:
   - as the specific condition, when there is no past travelling path information that corresponds to the specific area, generating the presentation information that instructs to display the relocation path in a different mode of display.

3. The information presentation method according to claim 1,
   - wherein the generating of the presentation information includes:
   - as the specific condition, when there is past travelling path information that corresponds to the specific area, generating the presentation information that instructs to display the cleaning path in a different mode of display.

4. The information presentation method according to claim 1,
   - wherein the generating of the presentation information includes:
   - as the specific condition, when the specific area is divided into the plurality of blocks of the predetermined size and when the travelling path that includes the cleaning path and the relocation path and that occupies at least one of the plurality of blocks has a density greater than or equal to the given value, generating the presentation information that instructs to display the relocation path in a different mode of display.

5. The information presentation method according to claim 4,
   - wherein the generating of the presentation information further includes:
   - generating the presentation information that instructs to display the relocation path in a different mode of display for each of the plurality of blocks in accordance with the density of the travelling path that occupies the block.

6. The information presentation method according to claim 1,
   - wherein the mode of display corresponds to light and shade of a path displayed on a display.

7. The information presentation method according to claim 1,
   - wherein the mode of display corresponds to a color of a path displayed on a display.

8. The information presentation method according to claim 1,
   - wherein the mode of display corresponds to brightness of a path displayed on a display.

9. The information presentation method according to claim 1,
   - wherein the mode of display corresponds to a line thickness of a path displayed on a display.

10. The information presentation method according to claim 1,
    - wherein the mode of display corresponds to a line type of a path displayed on a display.

11. The information presentation method according to claim 1, the information presentation method further comprising:
    - generating proposal information when a full length of the relocation path included in the travelling path information acquired is greater than or equal to a predetermined value, the proposal information indicating a proposal to change the route of the self-propelled vacuum cleaner for next cleaning; and
    - presenting the proposal information to the user.

12. The information presentation method according to claim 11, further comprising:
    - when the user has approved the proposal information, transmitting a command to change the route of the self-propelled vacuum cleaner for next cleaning to the self-propelled vacuum cleaner in accordance with the proposal information.

13. The information presentation method according to claim 1, wherein
    - the generating includes, when the specific condition is not satisfied, generating presentation information that instructs to display the cleaning path and the relocation path in a same mode of display.

14. The information presentation device according to claim 1, wherein
    - the presentation information generator generates presentation information that instructs to display the cleaning path and the relocation path in a same mode of display when the specific condition is not satisfied.

15. An information presentation device comprising:
- an acquirer that acquires travelling path information that includes a cleaning path and a relocation path, the cleaning path showing a position cleaned by a self-propelled vacuum cleaner in each of a plurality of regions included in a specific area, and the relocation path showing a route of the self-propelled vacuum cleaner that has travelled from one region to another region different from the one region out of the plurality of regions, the route being included in the specific area;
- a condition determiner that determines whether the travelling path information acquired by the acquirer satisfies a specific condition, the specific condition includes at least one of (i) the specific area has been cleaned in the past with cleaning frequency greater than or equal to a predetermined value and (ii) when the specific area is divided into a plurality of blocks of a predetermined size, a travelling path including the cleaning path and the relocation path and occupying at least one of the plurality of blocks has a density greater than or equal to a given value;
- a presentation information generator that generates presentation information that includes the cleaning path and the relocation path and that instructs to display at least one of the cleaning path or the relocation path in a different mode of display when the specific condition is satisfied; and
- a display device that presents the presentation information to a user as a travelling path of the self-propelled vacuum cleaner in the specific area.

16. A non-transitory computer-readable recording medium for recording a program that causes a computer to execute:
- acquiring travelling path information that includes a cleaning path and a relocation path, the cleaning path showing a position cleaned by a self-propelled vacuum cleaner in each of a plurality of regions included in a specific area, and the relocation path showing a route of the self-propelled vacuum cleaner that has travelled from one region to another region different from the one region out of the plurality of regions, the route being included in the specific area;
- determining whether a specific condition is satisfied, and when the specific condition is satisfied, generating presentation information that includes the cleaning path and the relocation path and that instructs to display at least one of the cleaning path or the relocation path in a different mode of display; and
- presenting the presentation information to a user as a travelling path of the self-propelled vacuum cleaner in the specific area,
- wherein the specific condition includes at least one of (i) the specific area has been cleaned in the past with cleaning frequency greater than or equal to a predetermined value and (ii) when the specific area is divided into a plurality of blocks of a predetermined size, a travelling path including the cleaning path and the relocation path and occupying at least one of the plurality of blocks has a density greater than or equal to a given value.

17. The non-transitory computer-readable recording medium according to claim 16, wherein the generating includes, when the specific condition is not satisfied, generating presentation information that instructs to display the cleaning path and the relocation path in a same mode of display.

* * * * *